United States Patent
Wu

(10) Patent No.: US 10,313,934 B2
(45) Date of Patent: Jun. 4, 2019

(54) DEVICE AND METHOD OF HANDLING COMMUNICATION

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 62 days.

(21) Appl. No.: 15/831,402

(22) Filed: Dec. 5, 2017

(65) Prior Publication Data

US 2018/0160339 A1   Jun. 7, 2018

Related U.S. Application Data

(60) Provisional application No. 62/430,312, filed on Dec. 5, 2016.

(51) Int. Cl.
*H04W 36/00* (2009.01)
*H04W 28/02* (2009.01)
(Continued)

(52) U.S. Cl.
CPC ......... *H04W 36/0055* (2013.01); *H04L 5/001* (2013.01); *H04L 5/0035* (2013.01);
(Continued)

(58) Field of Classification Search
CPC .. H04W 36/0055; H04L 5/0035; H04L 5/001; H04L 5/0053
See application file for complete search history.

(56) References Cited

U.S. PATENT DOCUMENTS

| 2014/0242946 A1 | 8/2014 | Wu |
| 2017/0055242 A1* | 2/2017 | Kusashima ........... H04L 5/0051 |

(Continued)

FOREIGN PATENT DOCUMENTS

| EP | 2983445 A1 | 2/2016 |
| WO | 2015/142104 A1 | 9/2015 |
| WO | 2016/035835 A1 | 3/2016 |

OTHER PUBLICATIONS

Search Report dated Apr. 11, 2018 for EP application No. 17205352.2, pp. 1-4.

(Continued)

*Primary Examiner* — Asad M Nawaz
*Assistant Examiner* — Syed Ali
(74) *Attorney, Agent, or Firm* — Winston Hsu

(57) ABSTRACT

A first BS of handling communication comprises instruction of connecting to a communication device; transmitting an addition request to a second BS; receiving an addition request acknowledgement comprising a SCG configuration configuring a SCG from the second BS; transmitting a RRC message comprising the SCG configuration to the communication device; receiving a RRC complete message from the communication device; performing a determination of a release of the second BS for the communication device; generating a release request, wherein the first BS requests a data forwarding in the release request if the release is caused by at least one measurement result of the SCG, a handover, a SCG failure or a MCG failure, and the first BS does not request the data forwarding in the release request if the release is caused by a RRC connection release or a user inactivity; and transmitting the release request to the second BS.

13 Claims, 4 Drawing Sheets

(51) Int. Cl.
*H04W 36/30* (2009.01)
*H04W 76/30* (2018.01)
*H04W 76/27* (2018.01)
*H04L 5/00* (2006.01)

(52) U.S. Cl.
CPC ....... *H04W 28/0278* (2013.01); *H04W 36/30* (2013.01); *H04W 76/27* (2018.02); *H04W 76/30* (2018.02); *H04L 5/0053* (2013.01)

(56) References Cited

U.S. PATENT DOCUMENTS

| | | | | |
|---|---|---|---|---|
| 2017/0302419 | A1* | 10/2017 | Liu | H04W 48/12 |
| 2017/0318575 | A1* | 11/2017 | Park | H04W 72/0413 |
| 2018/0092051 | A1* | 3/2018 | Dinan | H04L 5/001 |
| 2018/0199354 | A1* | 7/2018 | Yi | H04W 28/02 |
| 2018/0227838 | A1* | 8/2018 | Hayashi | H04L 5/001 |
| 2018/0376339 | A1* | 12/2018 | Hu | H04W 16/14 |

OTHER PUBLICATIONS

3GPP TS 36.300 V14.0.0, Sep. 2016.
Ericsson, Completion of basic signalling flows, 3GPP TSG-RAN WG3 Meeting #83bis, R3-140813, Mar. 31-Apr. 4, 2014, San Jose del Cabo, Mexico.
Pantech, Reestablishment in dual connectivity, 3GPP TSG-RAN WG2 Meeting #87, R2-143788, Aug. 18-22, 2014, Dresden, Germany.
3GPP TS 36.423 V14.0.0, 3rd Generation Partnership Project; Technical Specification Group Radio Access Network; Evolved Universal Terrestrial Radio Access Network (E-UTRAN); X2 application protocol (X2AP) (Release 14), Sep. 2016, pp. 43-53, 97, 100-105.
Office Action dated Nov. 13, 2018 for the Japanese Application No. 2017-233654, filing date Dec. 5, 2017, pp. 1-5.

* cited by examiner

DEVICE AND METHOD OF HANDLING COMMUNICATION

CROSS REFERENCE TO RELATED APPLICATIONS

This application claims the benefit of U.S. Provisional Application No. 62/430,312 filed on Dec. 5, 2016, which is incorporated herein by reference.

BACKGROUND OF THE INVENTION

1. Field of the Invention

The present invention relates to a device and a method used in a wireless communication system, and more particularly, to a device and a method of handling communication.

2. Description of the Prior Art

When a master base station (MBS) communicates with a secondary BS (SBS) and a user equipment (UE), the MBS may determine to release the SBS and may request the SBS to forward data of the UE to the MBS. However, the operation of requesting the SBS to forward the data of the UE to the MBS may be unnecessary, because the data of the UE may not be needed to be transmitted to the UE in certain situations (e.g., the UE disconnects with the MBS). Accordingly, the release of the SBS and the release of X2 connection between the MBS and the SBS may be delayed. As a result, communications between the MBS, the SBS and the UE cannot proceed efficiently.

SUMMARY OF THE INVENTION

The present invention therefore provides a communication device and method for handling communication to solve the abovementioned problem.

A first base station (BS) of handling communication comprises a storage device for storing instructions and a processing circuit coupled to the storage device. The processing circuit is configured to execute the instructions stored in the storage device. The instructions comprise connecting to a communication device; transmitting an addition request to a second BS to request the second BS to allocate at least one radio resource for the communication device, when connecting to the communication device; receiving an addition request acknowledgement comprising a secondary cell group (SCG) configuration configuring a SCG for allocating the at least one radio resource for the communication device, from the second BS; transmitting a radio resource control (RRC) message to the communication device, wherein the RRC message comprises the SCG configuration; receiving a RRC complete message from the communication device, wherein the communication device transmits the RRC complete message in response to the RRC message; performing a determination of a release of the second BS for the communication device; generating a release request in response to the determination, wherein the first BS requests a data forwarding in the release request if the release is caused by at least one measurement result of the SCG, a handover, a SCG failure or a master cell group (MCG) failure, and does not request the data forwarding in the release request if the release is caused by a RRC connection release or a user inactivity; and transmitting the release request to the second BS.

A network comprising a first base station (BS) and a second BS for handling communication, configured to execute the instructions of: the first BS and the second BS connecting to a communication device in dual connectivity; the first BS performing a determination of a release of the second BS for the communication device; the first BS generating a release request in response to the determination, wherein the first BS requests a data forwarding in the release request if the release is caused by at least one measurement result of a secondary cell group (SCG), a handover, a SCG failure or a master cell group (MCG) failure, and the first BS does not request the data forwarding in the release request if the release is caused by a RRC connection release or a user inactivity; and the first BS transmitting the release request to the second BS.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
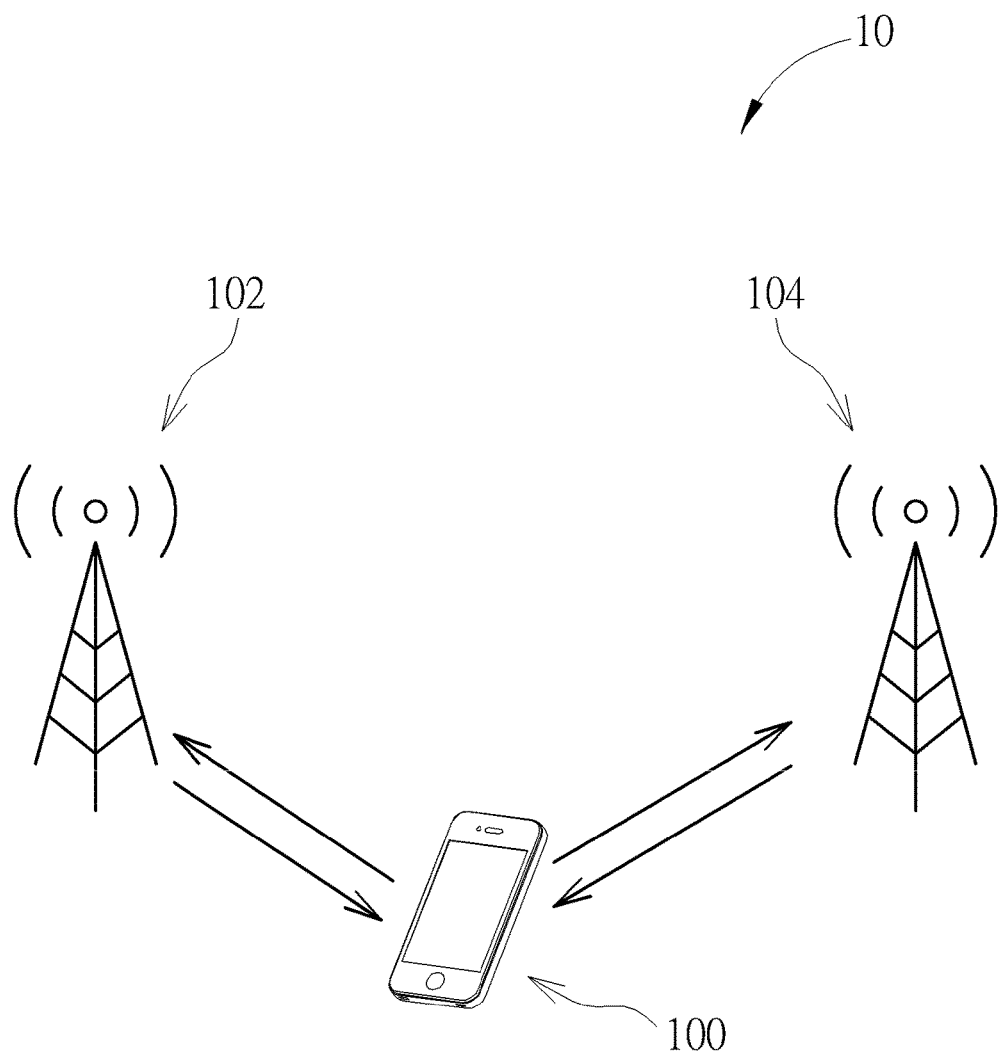
FIG. 1 is a schematic diagram of a wireless communication system according to an example of the present invention.

FIG. 1 is a schematic diagram of a wireless communication system 10 according to an example of the present invention. The wireless communication system 10 is composed of a communication device 100, base stations (BSs) 102 and 104. In FIG. 1, the communication device 100, the BSs 102 and 104 and are utilized for illustrating the structure of the wireless communication system 10. Practically, each of the BSs 102 and 104 may be an evolved Node-B (eNB) or a fifth generation (5G) (or called new radio (NR)) BS. The 5G (or NR) BS may support orthogonal frequency-division multiplexing (OFDM), filtered OFDM (F-OFDM), Generalized Frequency Division Multiplexing (GFDM), Universal Filtered MultiCarrier (UFMC), Filter Bank Multi-Carrier (FBMC) and/or non-OFDM. The 5G (or NR) BS may support a transmission time interval (TTI) shorter than 1 ms (e.g., 100 or 200 microseconds) and a wider system bandwidth (e.g., 100 or 200 MHz). In FIG. 1, coverage areas of the BS 102 and the BS 104 may be overlapped or non-overlapped. In general, a BS may also be used to refer any of the eNB and the 5G BS.

As shown in FIG. 1, the communication device 100 may be configured to communicate with the BSs 102 and 104 simultaneously according to dual connectivity (DC). That is, the communication device 100 may perform a transmission/reception via both the BSs 102 and 104. For example, the communication device 100 may transmit and/or receive packets (e.g., protocol data units (PDUs)) to and/or from the BS 102 via at least one cell of the BS 102, while the communication device 100 may transmit and/or receive packets (e.g., PDUs) to and/or from the BS 104 via at least one cell of the BS 104. In addition, one of the BSs 102 and 104 may be a master BS (MBS) and the other BS may be a secondary BS (SBS). One of the cell(s) of the MBS may be a primary cell (PCell) for the communication device 100. The other cell(s) (if available) of the MBS may be secondary cell (s) (SCell(s)) for the communication device 100. One of the cell(s) of the SBS may be a primary SCell (PSCell) for the communication device 100. The other cell(s) (if available) of the SBS may be SCell(s) for the communication device 100.

Technical terms related to the examples in the present invention are explained as follows to simplify description of successive examples. The DC may be an operation mode of a communication device in RRC_CONNECTED, which is configured with a master cell group (MCG) and a secondary cell group (SCG) to the communication device. A MBS may be an eNB (e.g., MeNB) or a 5G BS (e.g., MgNB). A SBS may be an eNB (e.g., SeNB) or a 5G BS (e.g., SgNB) which provides additional radio resources but is not a MBS. A MCG may include the PCell and the SCell(s) of the MBS if the SCell(s) is configured to the communication device. A SCG may include the PSCell and the SCell(s) of the SBS if the SCell(s) is configured to the communication device. A MCG bearer may be a radio bearer whose radio protocols are only located in a MBS to use MBS resources only. A SCG bearer may be a radio bearer whose radio protocols are only located in a SBS to use SBS resources. A split bearer may be a bearer whose radio protocols are located in both the MBS and the SBS to use both MBS and SBS resources.

The communication device 100 may be a user equipment (UE), a mobile phone, a laptop, a tablet computer, an electronic book, a portable computer system, a vehicle, or an airplane. For uplink (UL), the communication device 100 is the transmitter and the BS 102 and/or the BS 104 is the receiver, and for downlink (DL), the BS 102 and/or the BS 104 is the transmitter and the communication device 100 is the receiver.

Figure 2:
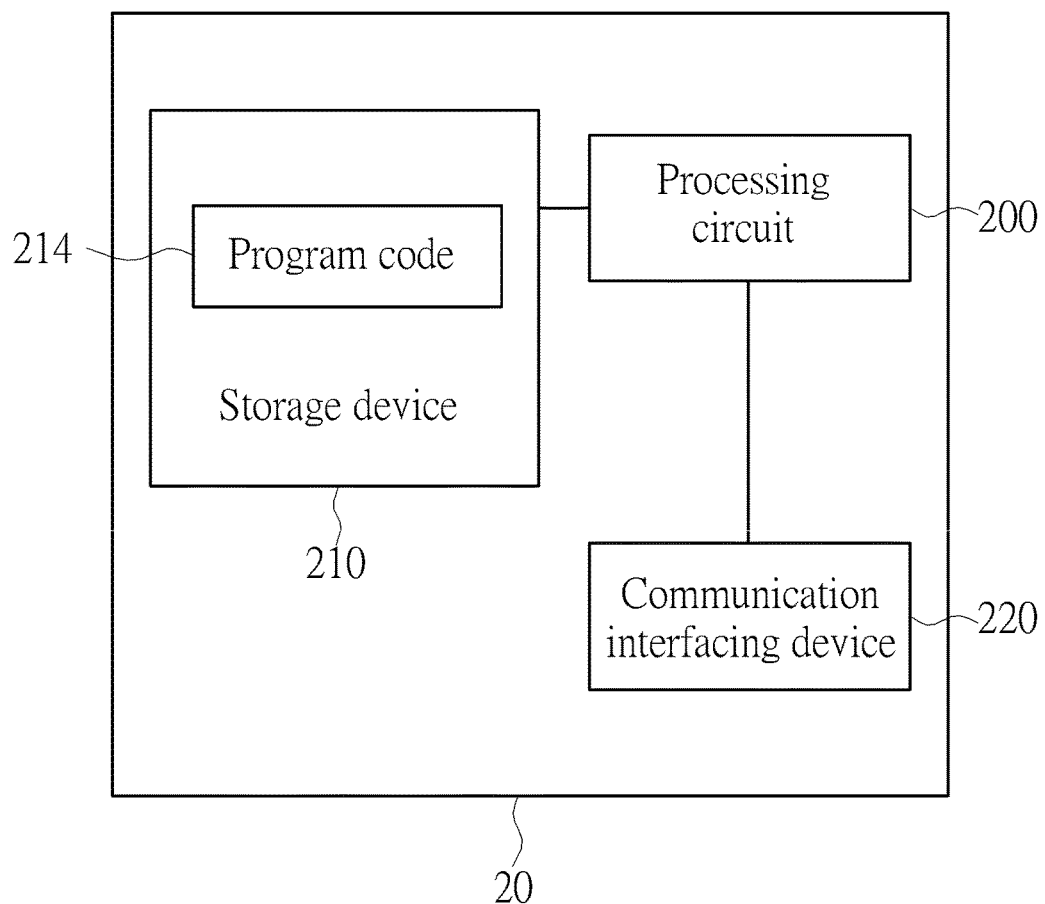
FIG. 2 is a schematic diagram of a communication device according to an example of the present invention.

FIG. 2 is a schematic diagram of a communication device 20 according to an example of the present invention. The communication device 20 may be the communication device 100, the BS 102 or the BS 104 shown in FIG. 1, but is not limited herein. The communication device 20 may include a processing circuit 200 such as a microprocessor or Application Specific Integrated Circuit (ASIC), a storage device 210 and a communication interfacing device 220. The storage device 210 may be any data storage device that may store a program code 214, accessed and executed by the processing circuit 200. Examples of the storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The communication interfacing device 220 includes at least one transceiver used to transmit and receive signals (e.g., data, messages and/or packets) according to processing results of the processing circuit 200. The BS 102 and the BS 104 may belong to (e.g., is managed/controlled by) a network to perform steps or instructions for realizing the following examples.

In the following examples, a UE is used for representing the communication device in FIG. 1, to simplify the illustration of the examples.

Figure 3:
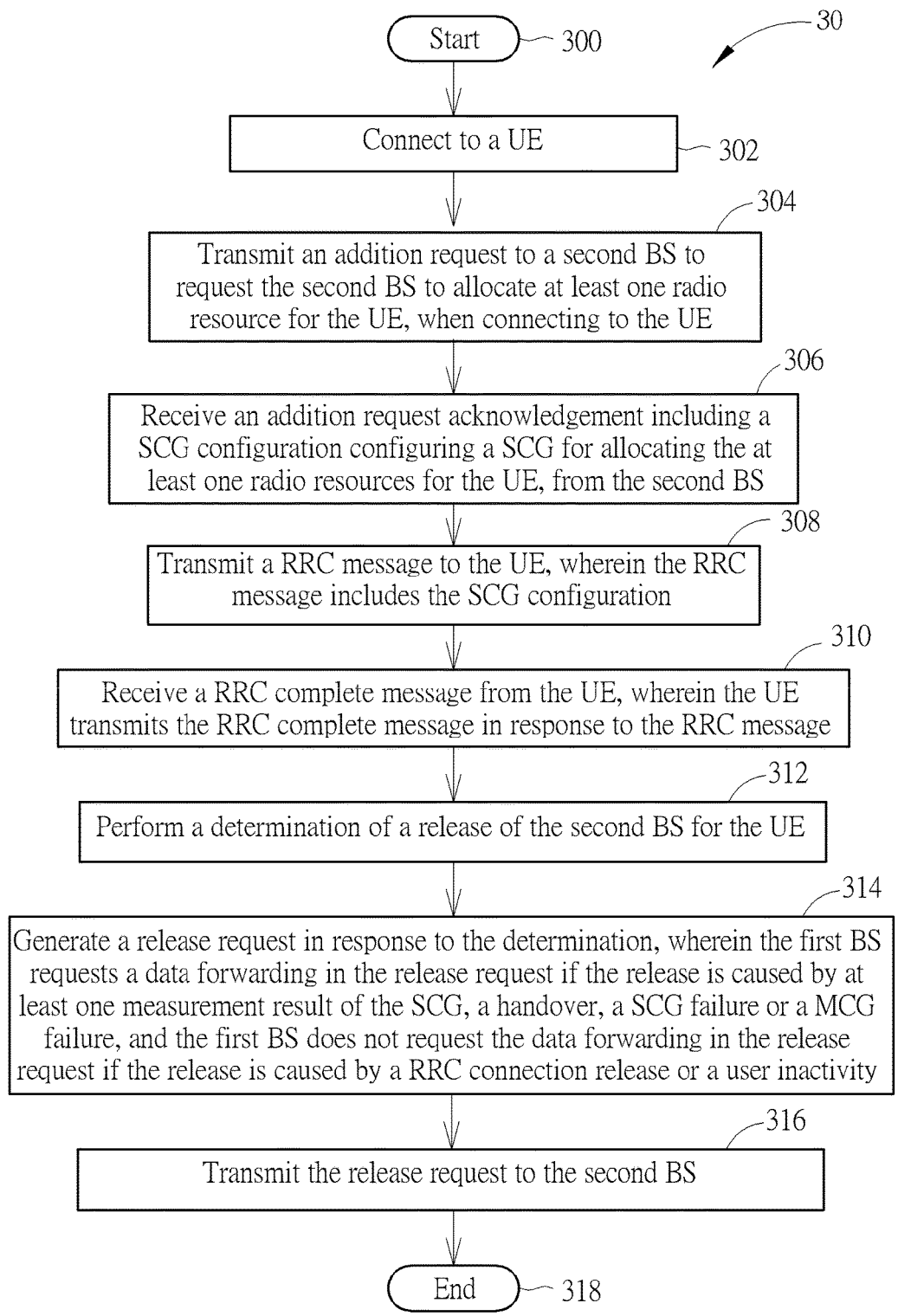
FIG. 3 is a flowchart of a process according to an example of the present invention.

FIG. 3 is a flowchart of a process 30 according to an example of the present invention. The process 30 may be utilized in a first BS (e.g., the BS 102), to handle communication. The process 30 includes the following steps:

Step 300: Start.

Step 302: Connect to a UE.

Step 304: Transmit an addition request to a second BS to request the second BS to allocate at least one radio resource for the UE, when connecting to the UE.

Step 306: Receive an addition request acknowledgement including a SCG configuration configuring a SCG for allocating the at least one radio resource for the UE, from the second BS.

Step 308: Transmit a radio resource control (RRC) message to the UE, wherein the RRC message includes the SCG configuration.

Step 310: Receive a RRC complete message from the UE, wherein the UE transmits the RRC complete message in response to the RRC message.

Step 312: Perform a determination of a release of the second BS for the UE.

Step 314: Generate a release request in response to the determination, wherein the first BS requests a data forwarding in the release request if the release is caused by at least one measurement result of the SCG, a handover, a SCG failure or a MCG failure, and does not request the data forwarding in the release request if the release is caused by a RRC connection release or a user inactivity.

Step 316: Transmit the release request to the second BS.

Step 318: End.

According to the process 30, the first BS (e.g., the MBS/MeNB) connects to a UE. The first BS transmits an addition request (e.g., SBS/SeNB Addition Request) to a second BS (e.g., the BS 104, the SBS/SeNB) to request the second BS to allocate at least one radio resource for the UE, when connecting to the UE. The first BS receives an addition request acknowledgement (e.g., SBS/SeNB Addition Request Acknowledge) including a SCG configuration configuring a SCG for allocating the at least one radio resource for the UE, from the second BS. The first BS transmits a RRC message (e.g., RRC Connection Reconfiguration) to the UE, wherein the RRC message includes the SCG configuration. The first BS receives a RRC complete message (e.g., RRC Connection Reconfiguration Complete) from the UE, wherein the UE transmits the RRC complete message in response to the RRC message. The first BS performs a determination of a release of the second BS for the UE. Then, the first BS generates a release request (e.g., SBS/SeNB Release Request) in response to the determination, wherein the first BS requests a data forwarding in the release request if the release is caused by at least one measurement result of the SCG, a handover, a SCG failure or a MCG failure, and does not request the data forwarding in the release request if the release is caused by a RRC connection release or a user inactivity. The first BS transmits the release request to the second BS. That is, the first BS determines whether to request the second BS to forward data of the UE according to different conditions.

Figure 4:
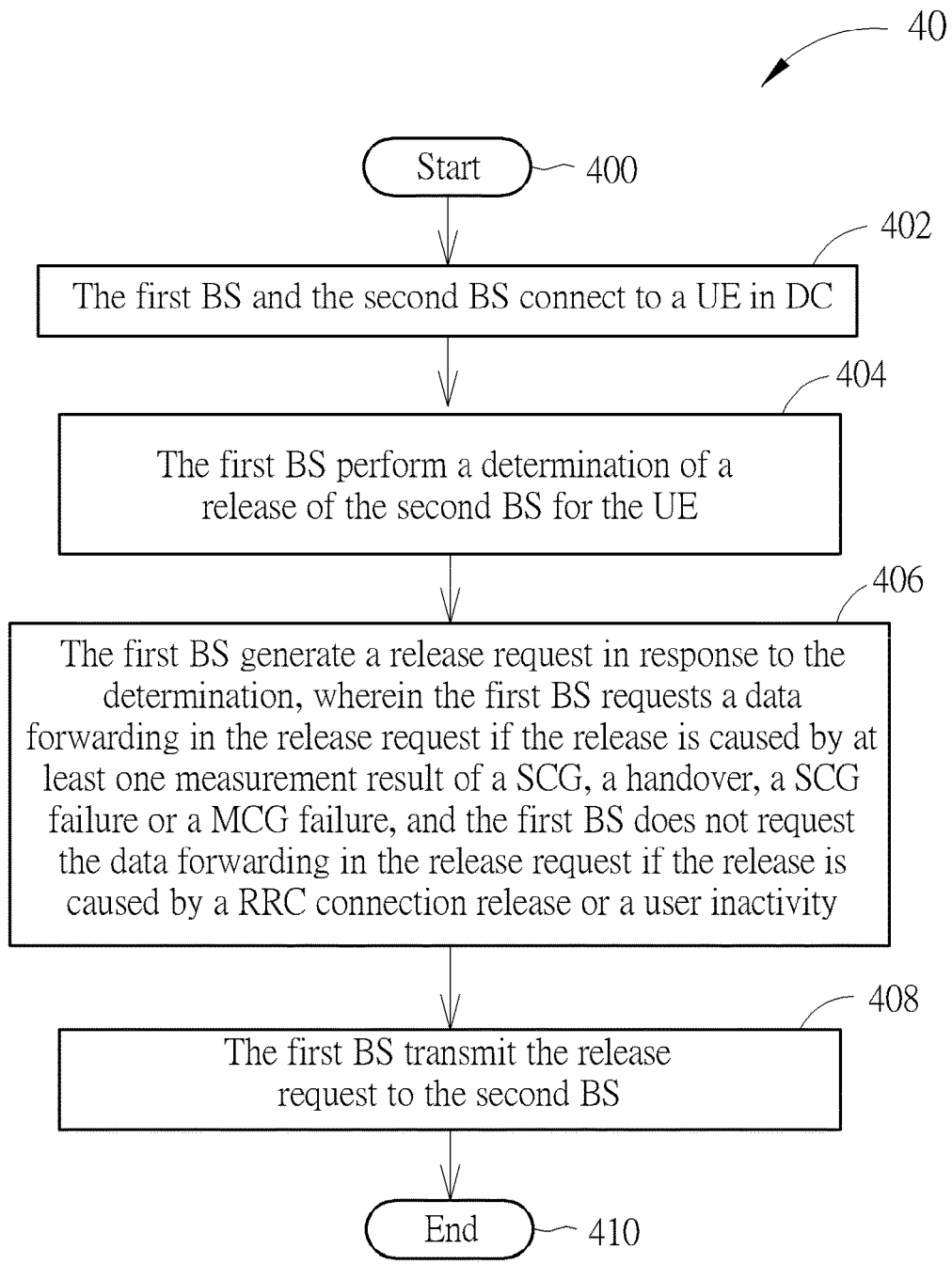
FIG. 4 is a flowchart of a process according to an example of the present invention.

FIG. 4 is a flowchart of a process 40 according to an example of the present invention. The process 40 may be utilized in a network including a first BS (e.g., the BS 102) and a second BS (e.g., the BS 104), to handle communication. The process 40 includes the following steps:

Step 400: Start.

Step 402: The first BS and the second BS connect to a UE in DC.

Step 404: The first BS performs a determination of a release of the second BS for the UE.

Step 406: The first BS generates a release request in response to the determination, wherein the first BS requests a data forwarding in the release request if the release is caused by at least one measurement result of a SCG, a handover, a SCG failure or a MCG failure, and the first BS does not request the data forwarding in the release request if the release is caused by a RRC connection release or a user inactivity.

Step 408: The first BS transmits the release request to the second BS.

Step 410: End.

According to the process 40, the first BS (e.g., the MBS/MeNB) and the second BS (e.g., the SBS/SeNB) connect to a UE in DC. The first BS performs a determination of a release of the second BS for the UE. Then, the first BS generates a release request (e.g., SBS/SeNB Release Request) in response to the determination, wherein the first BS requests a data forwarding in the release request if the release is caused by at least one measurement result of a SCG, a handover, a SCG failure or a MCG failure, and the first BS does not request the data forwarding in the release request if the release is caused by a RRC connection release or a user inactivity. The first BS transmits the release request to the second BS. That is, the first BS determines whether to request the second BS to forward data of the UE according to different conditions.

According to processes 30 and 40, the first BS requests the second BS to forward the data of the UE, if the corresponding condition is satisfied. Accordingly, the problem that the first BS may unnecessarily request the second BS to forward the data of the UE is solved. Delay caused to the release of the second BS and the release of X2 connection between the first BS and second BS is solved.

Realization of the present invention is not limited to the above description. The following examples may be applied for realizing the processes 30-40.

In one example, the first BS receives the at least one measurement result of the SCG from the UE. In one example, the first BS performs the determination of the release of the second BS for the UE, when the at least one measurement result of the SCG indicates that at least one signal strength of all of at least one cell of the SCG is weak (e.g., lower than a threshold). That is, the release is caused by the at least one measurement result of the SCG. The first BS performs the determination of the release of the second BS for the UE by transmitting the release request to the second BS.

In one example, the first BS performs the determination of the release of the second BS for the UE, when the first BS determines to hand over the UE to a third BS. That is, the release is caused by the handover. The first BS performs the determination of the release of the second BS for the UE by transmitting the release request to the second BS.

In one example, the first BS requests the data forwarding by including data forwarding request information in the release request, and does not request the data forwarding by not including the data forwarding request information in the release request message. In one example, the data forwarding request information indicates at least one bearer where data (e.g., of the UE) is forwarded. In one example, the data forwarding request information indicates at least one of DL data and UL data (e.g., of the UE) which is forwarded. In one example, the second BS forwards data indicated by the data forwarding request information (e.g., the at least one of DL data and UL data) to the first BS, when the second BS receives the release request including the data forwarding request information. The second BS may not forward data of the UE to the first BS, when the second BS receives the release request not including the data forwarding request information. The data may include at least one Packet Data Convergence Protocol (PDCP) Service Data Unit (SDU) or at least one Internet Protocol (IP) packet. The PDCP SDU or the IP packet may not be encrypted, and no header of the PDCP SDU or the IP packet is compressed according to the PDCP.

In one example, the first BS determines that the user inactivity occurs, when the first BS does not receive data from the UE (e.g., for a time interval) and the first BS has no data to be transmitted to the UE. In one example, the first BS determines that the user inactivity occurs, when the first BS has no data to be transmitted to the UE and the first BS receives a buffer status report (BSR) indicating that no data is in a buffer of the UE from the UE.

In one example, the first BS configures a RRC connection with the UE via a first cell of the first BS. The second BS transmits a SCG configuration to the first BS, wherein the SCG configuration changes a SCG (i.e., a SCG change). The first BS transmits the RRC message on the RRC connection via the first cell to the UE, wherein the RRC message includes the SCG configuration. The first BS receives the RRC complete message from the UE via the first cell or a second cell of the first BS. The first BS transmits a complete message to the second BS in response to the RRC complete message.

In one example, the first BS transmits an addition request (e.g., SBS/SeNB Addition Request) to the second BS to request the second BS to serve the UE in the DC with the first BS. The second BS transmits the SCG configuration (e.g., in a SBS/SeNB Addition Request Acknowledge) for a SCG establishment in response to the addition request to the first BS. The SCG configuration may configure at least one radio bearer (RB). A RB of the at least one RB may be a signaling RB (SRB) or a data RB (DRB).

In one example, the UE has been simultaneously connected to the first BS and the second BS. The first BS transmits a modification request (e.g., SBS/SeNB Modification Request) to the second BS. The second BS transmits a SCG configuration indicating a PSCell change or configuring a DRB (e.g., in a SBS/SeNB Modification Request Acknowledge) to the first BS in response to the modification request.

In one example, the UE has been simultaneously connected to the first BS and the second BS. The second BS transmits a SCG configuration indicating the SCG change (e.g., in a SBS/SeNB Modification Required) to the first BS, when the second BS determines releasing the SCG, changing the PSCell or refreshing at least one security key.

In one example, the first BS and the second BS are LTE eNBs or 5G BSs. In one example, the first BS is a LTE eNB and the second BS is a 5G BS. In another example, the first BS is a 5G BS and the second BS is a LTE eNB.

In one example, the UE is configured with a DRB which is a split bearer or a SCG bearer in the SCG configuration. In one example, the UE adds the SCG (e.g., SBS/SeNB addition) according to the SCG configuration. In one example, the UE changes the SCG (e.g., SCG or SBS/SeNB change) according to the SCG configuration. After successfully configuring the SCG, the UE simultaneously connects to the first BS and the second BS, i.e., the UE is in the DC.

In one example, the MCG failure includes an expiry of a timer T310, an expiry of a timer T312, a radio link failure (RLF) on the MCG, a random access (RA) problem on the MCG, or that the maximum number of retransmissions has been reached for a SRB, the MCG or a split DRB. The SCG failure may include an expiry of a timer T313, a RLF on the SCG, a RA problem on the SCG, or that the maximum number of retransmissions has been reached for the SCG or a split DRB.

In one example, the UE initiates a RRC connection reestablishment procedure by transmitting a "RRCConnectionReestablishmentRequest" message, when the UE determines (e.g., detects) that the MCG failure occurs. The first BS determines that the MCG failure occurs, when receiving the "RRCConnectionReestablishmentRequest" message from the UE. In one example, the first BS determines that the MCG failure occurs (e.g., by itself), when not receiving at least one control signal from the UE (e.g., for a while).

In one example, the UE initiates a SCG failure information procedure, when the UE determines that the SCG failure occurs. In the SCG failure information procedure, the UE transmits a "SCGFailureInformation" message to the first BS to notify the first BS that the SCG failure occurs. Accordingly, the first BS determines that the SCG failure occurs, when receiving the "SCGFailureInformation" message from the UE.

In one example, the RRC connection includes a SRB. In one example, the RRC Connection reconfiguration message is a "RRCConnectionReconfiguration", and the RRC Connection reconfiguration complete message is a "RRCConnectionReconfigurationComplete".

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program code 214.

To sum up, the present invention provides a method and related communication device for handling communication. The first BS requests the second BS to forward data of the UE, if the corresponding condition is satisfied. Thus, the problem that the first BS may unnecessarily request the second BS to forward the data of the UE is solved. As a result, communications between the first BS, the second BS and the UE can proceed efficiently.

What is claimed is:

1. A first base station (BS) of handling communication, comprising:
a storage device, for storing instructions of:
connecting to a communication device;
transmitting an addition request to a second BS to request the second BS to allocate at least one radio resource for the communication device, when connecting to the communication device;
receiving an addition request acknowledgement comprising a secondary cell group (SCG) configuration configuring a SCG for allocating the at least one radio resource for the communication device, from the second BS;
transmitting a radio resource control (RRC) message to the communication device, wherein the RRC message comprises the SCG configuration;
receiving a RRC complete message from the communication device, wherein the communication device transmits the RRC complete message in response to the RRC message;
performing a determination of a release of the second BS for the communication device;
generating a release request in response to the determination, wherein the first BS requests a data forwarding in the release request if the release is caused by at least one measurement result of the SCG, a handover, a SCG failure or a master cell group (MCG) failure, and does not request the data forwarding in the release request if the release is caused by a RRC connection release or a user inactivity; and
transmitting the release request to the second BS;
wherein the first BS determines that the user inactivity occurs, when the first BS has no data to be transmitted to the communication device and the first BS receives a buffer status report (BSR) indicating that no data is in a buffer of the communication device from the communication device; and
a processing circuit, coupled to the storage device, configured to execute the instructions stored in the storage device.

2. The first BS of claim 1, wherein the first BS performs the determination of the release of the second BS for the communication device, when the at least one measurement result of the SCG indicates that at least one signal strength of all of at least one cell of the SCG is lower than a threshold.

3. The first BS of claim 1, wherein the first BS requests the data forwarding by comprising data forwarding request information in the release request, and the first BS does not request the data forwarding by not comprising the data forwarding request information in the release request message.

4. The first BS of claim 1, wherein the first BS determines that the user inactivity occurs, when the first BS does not receive data from the communication device and the first BS has no data to be transmitted to the communication device.

5. A network comprising a first base station (BS) and a second BS for handling communication, configured to execute the instructions of:
the first BS and the second BS connecting to a communication device in dual connectivity (DC);
the first BS performing a determination of a release of the second BS for the communication device;
the first BS generating a release request in response to the determination, wherein the first BS requests a data forwarding in the release request if the release is caused by at least one measurement result of a secondary cell group (SCG), a handover, a SCG failure or a master cell group (MCG) failure, and the first BS does not request the data forwarding in the release request if the release is caused by a radio resource control (RRC) connection release or a user inactivity; and
the first BS transmitting the release request to the second BS;
wherein the first BS determines that the user inactivity occurs, when the first BS has no data to be transmitted to the communication device and the first BS receives a buffer status report (BSR) indicating that no data is in a buffer of the communication device from the communication device.

6. The network of claim 5, wherein the first BS and the second BS are configured to execute the instructions of:
the first BS configuring a RRC connection with the communication device via a first cell of the first BS;
the second BS transmitting a SCG configuration to the first BS, wherein the SCG configuration changes the SCG;
the first BS transmitting a RRC message on the RRC connection via the first cell to the communication device, wherein the RRC message comprises the SCG configuration;

the first BS receiving a RRC complete message from the communication device via the first cell or a second cell of the first BS, wherein the communication device transmits the RRC complete message in response to the RRC message; and the first BS transmitting a complete message to the second BS in response to the RRC complete message.

7. The network of claim 6, wherein the first BS and the second BS are configured to execute the instructions of:

the first BS transmitting an addition request to the second BS to request the second BS to serve the communication device in the DC with the first BS; and the second BS transmitting the SCG configuration for a SCG establishment in response to the addition request to the first BS.

8. The network of claim 5, wherein the first BS and the second BS are configured to execute the instructions of:

the first BS transmitting a modification request to the second BS; and the second BS transmitting a SCG configuration indicating a primary secondary cell (PSCell) change or configuring a data radio bearer (DRB) to the first BS in response to the modification request to the first BS.

9. The network of claim 5, wherein the second BS is configured to execute the instructions of:

transmitting a SCG configuration indicating a SCG change to the first BS, when the second BS determines releasing the SCG, changing a PSCell or refreshing at least one security key.

10. The network of claim 5, wherein the first BS performs the determination of the release of the second BS for the communication device, when the at least one measurement result indicates that at least one signal strength of all of at least one cell of the SCG is lower than a threshold.

11. The network of claim 5, wherein the first BS requests the data forwarding by comprising data forwarding request information in the release request, and the first BS does not request the data forwarding by not comprising the data forwarding request information in the release request message.

12. The network of claim 11, wherein the data forwarding request information indicates at least one bearer where data is forwarded.

13. The network of claim 11, wherein the second BS is configured to execute the instructions of:

forwarding data indicated by the data forwarding request information to the first BS, when the second BS receives the release request comprising the data forwarding request information; and not forwarding data of the communication device to the first BS, when the second BS receives the release request not comprising the data forwarding request information.

* * * * *